7635X
E. Nott.
Damper.
Patented Jan. 29, 1833.
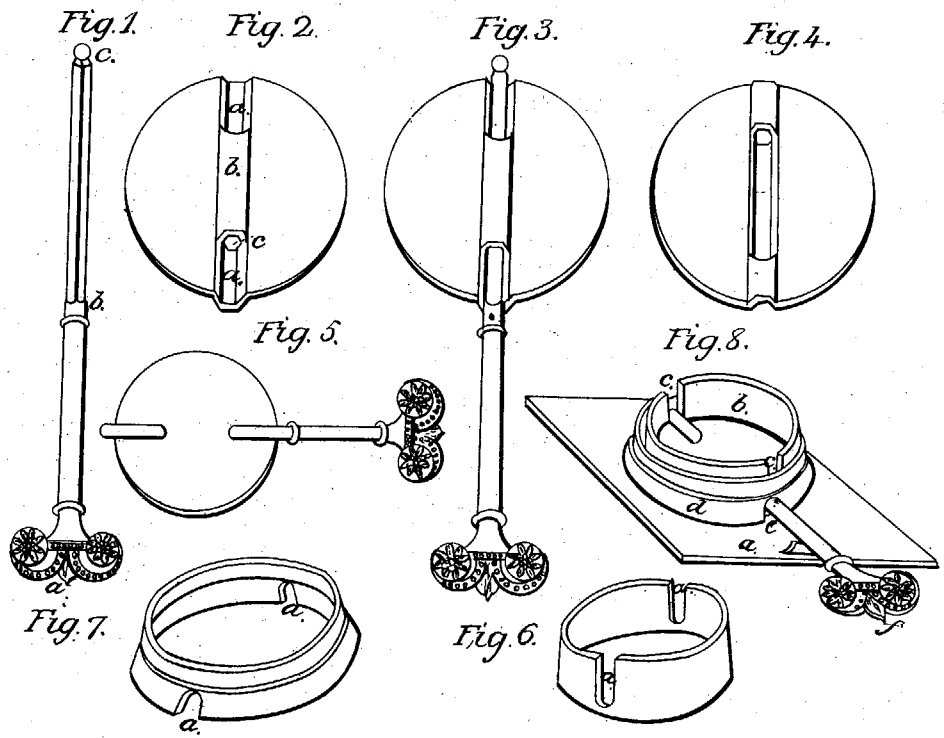

76358 June 29. 1833

Case " 1. "

Eliphalet Nott.

Letters Patent.

The Schedule referred to in these Letters Patent and making part
of the same, containing a description in the words of the said Eliphalet
Nott himself, of his improvement, in the Anthracite coal stove. by
closing the ash pit, illuminating the front, and transferring the
door to the top thereof.

---

Case No. 1.

Specification of improvements made in the anthracite coal stove
by illuminating its front, transferring the door to the top, and en=
closing the ash pit. Whereas inconvenience has arisen in said
stove from the invisibility of the fire, and the want of an opening
at the top for the admission of fuel and the use of the poker, as well
as from the diffusion of ashes and the ingress of cold air from
the ash pit; Therefore certain improvements have been attempted
and the same having been tested and perfected by repeated experi=
ments are now intended to be introduced into general use; which
improvements consist. In combining a vertical front grate and
an exterior sash containing laminated mica or other transparent
material, the same being constructed and adjusted in place as here
=tofore in any manner preferred, with an opening at top, governed
by a door or lid, for putting in the fuel & using the poker; and also
if desired, with a closed ash pit having its inlet for air governed by
a val=e or an ash drawer operating as a valve. For further informa
=tion, reference may be had to the drawings and explanations here
=unto subjoined. Summary. The improvement herein
contemplated consists in combining in an Anthracite coal stove,
a vertical front grate and a sash exterior thereto containing lami=
nated mica or other transparent material with an opening
at top, governed by a door or lid for the admission of fuel and the

7635X the use of the poker; and also if desired with a closed ashpit having its inlet for air governed by a valve or an ash drawer operating as a valve. I therefore claim as my invention & improvement the illuminating of the front of an anthracite coal stove and the opening of access thereto vertically, for the admission of fuel and the use of the poker, by combining in front a vertical grate and an [illegible] sash for mica or other transparent substance, with an opening at top governed by a door or lid, and this whether the closed ashpit with its inlet for air governed by a valve, or an ash drawer, operating as a valve, be added to the foregoing combinations or not, though such addition is preferred together with the uses to which said combination has been or may be applied.

Exd. Witnesses
W.G. G. F. Yates
D. Boyd

Eliphalet Nott (470 words)

(Granted 29. June 1833)
(Drawing in Port folio)